United States Patent [19]

Gergely

[11] Patent Number: 4,922,095
[45] Date of Patent: May 1, 1990

[54] METHOD AND APPARATUS FOR SENSING DISTURBANCE USING FIBER-OPTIC POLARIZATION ROTATION

[75] Inventor: John S. Gergely, Ponca City, Okla.

[73] Assignee: Conoco Inc., Ponca City, Okla.

[21] Appl. No.: 351,147

[22] Filed: May 11, 1989

[51] Int. Cl.⁵ .............................................. H01J 5/16
[52] U.S. Cl. ........................... 250/227.17; 250/225; 73/516 LM; 73/653
[58] Field of Search ............... 250/227, 225, 231 R; 73/516 LM, 517 R, 653, 655, 657; 356/350, 351

[56] References Cited

U.S. PATENT DOCUMENTS

| | | | |
|---|---|---|---|
| 4,110,609 | 8/1978 | Beer | 250/231 R |
| 4,159,577 | 7/1979 | Bergkvist | 33/366 |
| 4,173,412 | 11/1979 | Ramsay et al. | 356/33 |
| 4,291,978 | 9/1981 | Seigel | 356/152 |
| 4,295,738 | 10/1981 | Meltz et al. | 356/32 |
| 4,322,829 | 3/1982 | Davis, Jr. et al. | 73/653 |
| 4,363,114 | 12/1982 | Bucaro et al. | 73/655 |
| 4,375,680 | 3/1983 | Cahill et al. | 367/149 |
| 4,408,495 | 10/1983 | Couch et al. | 73/655 |
| 4,420,260 | 12/1983 | Martinelli | 356/351 |
| 4,422,167 | 12/1983 | Shajenko | 73/655 |
| 4,428,234 | 1/1984 | Walker | 73/653 |
| 4,446,543 | 5/1984 | McLandrich et al. | 367/149 |
| 4,495,411 | 1/1985 | Rashleigh | 250/227 |
| 4,515,473 | 5/1985 | Mermelstein | 356/33 |
| 4,519,252 | 5/1985 | McMahon | 250/23 P |
| 4,525,818 | 6/1985 | Cielo et al. | 367/149 |
| 4,534,222 | 8/1985 | Finch et al. | 73/653 |
| 4,564,289 | 1/1986 | Spillman, Jr. | 356/33 |
| 4,593,385 | 6/1986 | Chamuel | 367/149 |
| 4,613,752 | 9/1986 | Davis | 73/516 LM |
| 4,617,113 | 6/1987 | Carome | 250/227 |
| 4,642,458 | 2/1987 | Jackson et al. | 250/225 |
| 4,644,153 | 2/1987 | Ida | 250/225 |
| 4,799,752 | 1/1989 | Carome | 73/657 |
| 4,829,821 | 5/1989 | Carome | 250/227 |
| 4,841,774 | 6/1989 | Hall | 73/517 R |

Primary Examiner—David C. Nelms
Assistant Examiner—Stephone B. Allen

[57] ABSTRACT

A method and apparatus for sensing vibrational disturbance using fiber optic coils conducting circularly polarized light. A circularly polarized light source illuminates each of a sensing fiber optic coil in a disturbance-sensitive environment and a reference fiber optic coil in a constant environment, and light from both coils is analyzed through polarization shuttering to detect the degree of polarization rotation thereby to enable determination of frequency and amplitude of the disturbance.

25 Claims, 5 Drawing Sheets

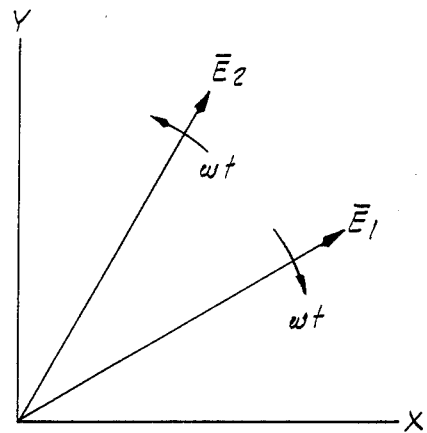
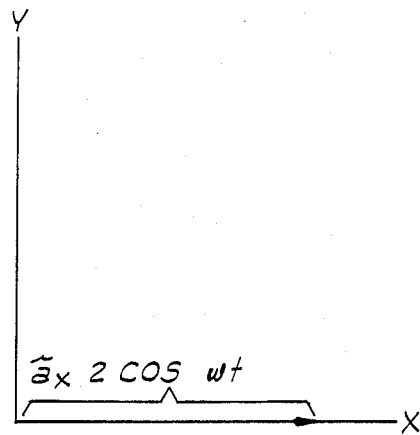
FIG. 1
FIG. 2
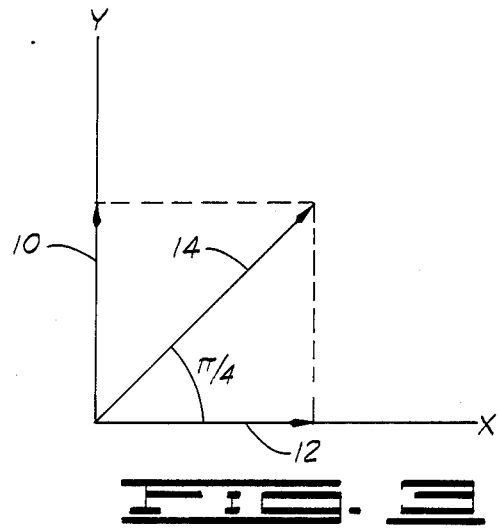
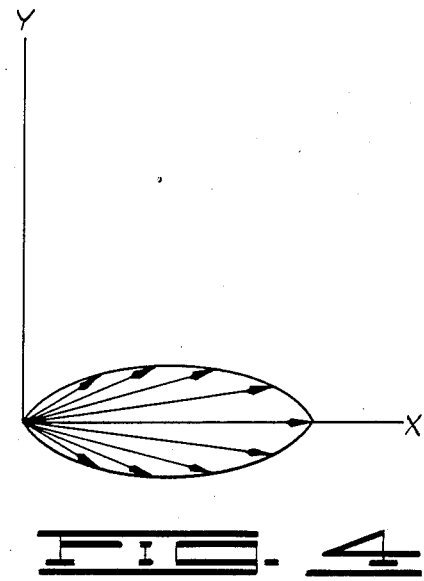
FIG. 3
FIG. 4

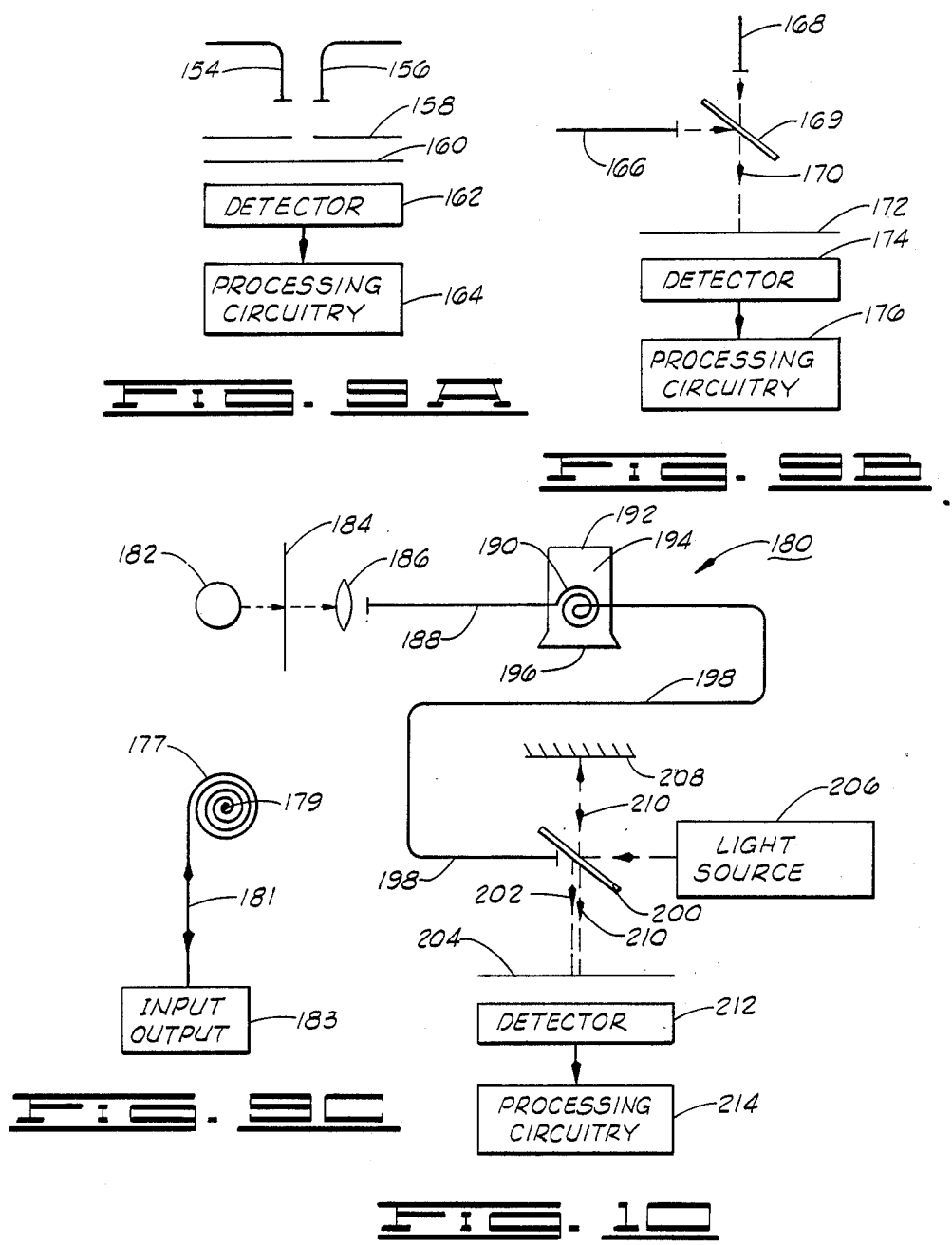

METHOD AND APPARATUS FOR SENSING DISTURBANCE USING FIBER-OPTIC POLARIZATION ROTATION

BACKGROUND OF THE INVENTION

1. Field of the Invention

The invention relates generally to a technique for sensing disturbances such as shear waves, pressure changes, acoustic signals, etc. and, more particularly, but not by way of limitation, it relates to method and apparatus using elliptically polarized light waves to derive an electric field vector that is indicative of the change in length of a single-mode polarization-preserving fiber-optic cable.

2. Description of the Prior Art

Pior art includes a number of disturbance sensing systems that utilize fiber-optic sensing elements. Such systems of recent development use fiber-optic sensors to provide an indication of the change in length of a single-mode fiber cable that is influenced by the environment to exhibit a change in the phase of a light travelling through it. Light leaving the end of the fiber cable is then sensed for combination with light coming from a reference fiber cable that was isolated from the environment. Combining of these two light waves then results in a high or low value of light due to constructive or destructive interference, and the resulting light level is related to the pressure that is exerted on the fiber-optic cable by the environment. U.S. Pat. No. 4,420,260 provides a representative teaching of the general class of phase-change sensing devices.

U.S. Pat. No. 4,534,222 teaches the use of a dual fiber coil interferometer with sensing and reference coils which develops a differential light delay, i.e., a phase difference, through the sensing optics in response to an external pressure. The detected phase difference is then directly related to the applied pressure or vibration and can be so indicated. U.S. Pat. No. 4,564,289 provides yet another teaching of differential measurement that utilizes two optical fiber coils experiencing difference in stress. The device utilizes two optical fibers arranged in series with a polarization rotator intermediate the coils so that equal stresses to the optical fiber will have equal and opposite effects upon polarized light transmission.

Finally, a U.S. Pat. No. 4,644,153 discloses an optical sensing equipment that utilizes first and second light sources that are alternately activated to experience a disturbance with subsequent determination of first and second detected outputs. The ratio of the two outputs is then calculated to provide a signal representing the measured quantity while the system eliminates the effects of light source fluctuations and fiber transmission losses by a process of common mode rejection.

SUMMARY OF THE INVENTION

The present invention relates to a novel form of environmental disturbance detection using a single-mode polarization-preserving fiber-optic cable which experiences a change in length (or index) in response to the disturbance and effects a change of the angular position of a resultant electric field vector on the face of a polarizer. The resultant electric field vector is obtained by the superposition of two circularly polarized light waves of different "handedness", i.e., the direction of electric field vector rotation relative to the direction of propagation. The amount of light passed by the polarizer depends upon the angular position of the resultant electric field with respect to the polarization axis of the polarizer. Thus, the characteristics of the signal of interest may be obtained from the received power waveform as detected behind the polarizer.

Therefore, it is an object of the present invention to provide a new method of fiber-optic sensing.

It is also an object of the invention to provide sensing apparatus that is capable of sensing vibrations, pressure changes, acoustic signals and the like to an extremely fine degree of amplitude and/or frequency change.

It is still another object of the present invention to provide a fiber optic sensor that is readily adaptable for seismic detection work on earth surface, downhole or in other confined positions.

It is yet further an object of the invention to provide fiber-optic detectors for use with orbital shear wave logging equipment for such as vertical seismic profile (VSP) receivers.

Finally, it is an object of the present invention to provide a vibration detector of increased sensitivity and reliability.

Other objects and advantages of the invention will be evident from the following detailed description when read in conjunction with the accompanying drawings which illustrate the invention.

BRIEF DESCRIPTION OF THE DRAWINGS

FIG. 1 is a graphic depiction of electric field vectors as might appear on the face of a polarizer in the x-y plane;

FIG. 2 is a graphic depiction of a total electric field on the face of a polarizer for a rotation distance of 0;

FIG. 5 is a schematic drawing of a sensor configuration that may be utilized for change in optical fiber length of $\lambda/2$;

FIG. 6 is a schematic drawing of a sensor configuration that may be utilized for detecting any change in optical fiber length;

FIG. 9A is a schematic diagram of one form of technique for combining light waves;

FIG. 9B is a schematic diagram of a method for combining light waves using a beam splitter;

FIG. 9C shows a single fiber optical sensor coil;

FIG. 10 is a schematic diagram of an alternative form of sensing element that utilizes a single fiber-optic coil;

DETAILED DESCRIPTION OF THE INVENTION

Figure 3:
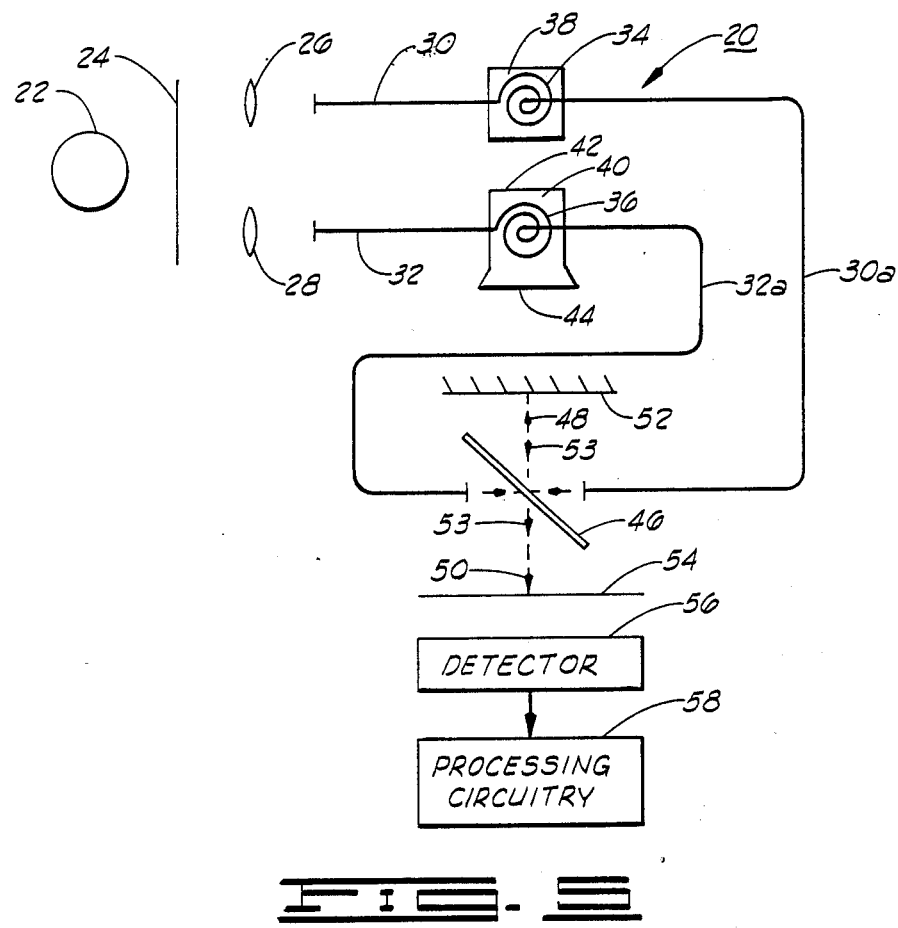
FIG. 3 is a graphic depiction of a total electric field vector on the face of a polarizer for the condition where the arcuate distance equals 45°.

Detection in accordance with the present method depends upon the received power waveform as it is picked up by a detector viewing along the polarization axis of a polarizer receiving light from a fiber optic detector element. For proper understanding, it is first necessary to define the received power waveform as a function of fiber length change and maximum resolution.

The expressions for circularly polarized waves, a special case of an elliptically polarized wave, are obtained by combining two polarized waves that are spatially 90° apart and travelling in the same direction, as shown in Equation 1.

$$\bar{E}_1 = \hat{a}_x E_{1x} \cos(\omega t - k_o Z) + \hat{a}_y E_{1y} \cos(\omega t - k_o Z + \psi) \quad (1)$$

For circular polarized light, $E_{1x}$ is equal to $E_{1y}$ which equals 1, and $\psi$ equals $\pm \pi/2$. For right-hand circular polarized light, $\psi = +\pi/2$, and for left-hand circular polarized light, $\psi = -\pi/2$. Since the sensor uses both right- and left-handed circular polarized waves, the expressions are $$\bar{E}_1 = \hat{a}_x \cos(\omega t - k_o Z) - \hat{a}_y \sin(\omega t - k_o Z), \quad (2)$$
right circular $$\bar{E}_2 = \hat{a}_x \cos(\omega t - k_o Z) + \hat{a}_y \sin(\omega t - k_o Z), \quad (3)$$
left circular At $Z=0$ and for a change in fiber length of $\Delta Z(t)$ in $\bar{E}_1$, $$\bar{E}_1 = \hat{a}_x \cos(\omega t - k_o \Delta Z(t)) - \hat{a}_y \sin(\omega t - k_o \Delta Z(t)) \quad (4)$$

$$\bar{E}_2 = \hat{a}_x \cos \omega t + \hat{a}_y \sin \omega t \quad (5)$$

Equations (2) and (3) describe the $\bar{E}$-field vectors for right and left circularly polarized waves, respectively, traveling through single-mode polarization-preserving fiber cables. At any given distance Z, the $\bar{E}_1$ vector traces out a circle that rotates clockwise with time when viewing into the beam. At any given time, the electric field distribution looks like a right-hand screw or helix along the Z-axis. On the other hand, $\bar{E}_2$ traces out a circle that rotates counterclockwise with time when viewing into the incoming beam. At any given time, the electric field looks like a left-hand screw or helix along the Z-axis.

Equation (5) represents a left-hand circularly polarized wave at $Z=0$, and Equation (4) represents a right-hand circularly polarized wave at $Z=0$, but the wave traveled a different distance because of a change in fiber length of $\Delta Z(t)$. The $\Delta Z(t)$ represents a change in the length of the fiber due to a change in the pressure exerted on the fiber, i.e., the detection effect.

As shown in FIG. 1, both the $\bar{E}_1$ and $\bar{E}_2$ vectors will trace out circles on the face of the polarizer. Since $\bar{E}_1$ and $\bar{E}_2$ are rotating in opposite directions at the same angular frequency, $\omega$, linear polarized light will result because of superposition. The direction of the resulting linearly polarized $\bar{E}$-field, $\bar{E}_T$, with respect to the x-axis depends on the phase difference $k_o \Delta Z(t)$ in the quantity $\bar{E}_2$. $\bar{E}_T$ will remain at some fixed angle to the x-axis for a given constant $\Delta Z(t)$, and it changes in intensity at the radial frequency $\omega$.

The total electric field falling on the face of the polarizer is $\bar{E}_T = \bar{E}_1 + \bar{E}_2$. Then it follows that $$\bar{E}_T = \hat{a}_x \{\cos(\omega t - k_o \Delta Z(t)) + \cos \omega t\} + \hat{a}_y \{\sin \omega t - \sin(\omega t - k_o \Delta Z(t))\} \quad (6)$$

and for $\Delta Z(t) = 0$, and as shown in the graph of FIG. 2, $$\bar{E}_T = \hat{a}_x 2 \cos \omega t \quad (7)$$

For a change in fiber length of $\Delta Z = \lambda/4$, $k_o \Delta Z = \pi/2$, and as shown in the graph of FIG. 3, $$\bar{E}_T = \hat{a}_x (\sin \omega t + \cos \omega t) + \hat{a}_y (\sin \omega t + \cos \omega t) \quad (8)$$

The total $\bar{E}$-field on the face of the polarizer for $\Delta Z(t) = \lambda/4$ is shown in FIG. 3. thus, the y axis vector 10 is equal to $\hat{a}_y (\sin \omega t + \cos \omega t)$ and the vector 12 equates to $\hat{a}_x (\sin \omega t + \cos \omega t)$ and the vector 14 or $\bar{E}_T$ vibrates at frequency $\omega$ at the fixed position $\pi/4$ from the x-axis.

Figure 4:
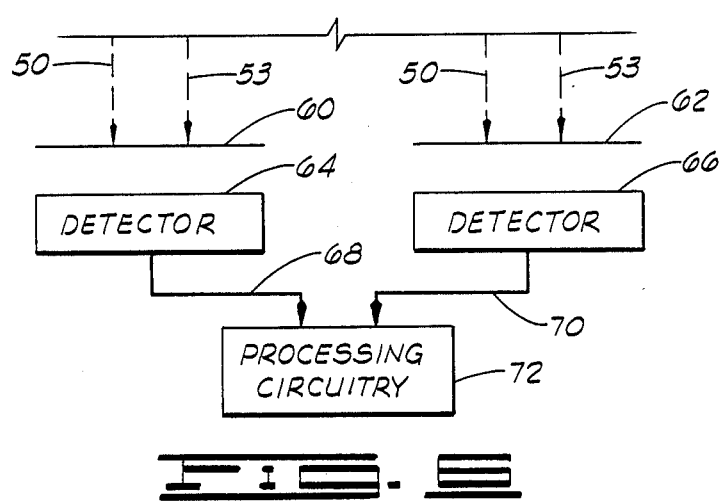
FIG. 4 is a graphic depiction of a plot of the total electric field as a first electric field vector rotates through 360° with a second electric field on the x- axis.

FIG. 4 illustrates a plot of $\bar{E}_T$ as $\bar{E}_1$ rotates through 360° with $\bar{E}_2$ on the x-axis. The speed and direction of rotation of $\bar{E}_T$ depend on how $\Delta Z(t)$ changes and this can be in any of a ramp, sinusoid or like configurations. If the polarization axis of the polarizer lies along the x-axis, only the $\hat{a}_x$ component of $\bar{E}_T$ passes through the polarizer and emerges as linearly polarized light. The total $\bar{E}$-field that passes through the polarizer is $$\bar{E}_{TP} + \hat{a}_x \{\cos(\omega t - k_o \Delta Z(t)) + \cos \omega t\} \quad (9)$$

If the change in length of the optical fiber is limited to 0 to $+\lambda/2$, $\bar{E}_T$ would rotate only in the first quadrant in FIG. 4, and $\bar{E}_{TP}$ would go from a maximum of $2 \cos \omega t$ at $\Delta Z(t)=0$ to a minimum of 0 at $\Delta Z(t)=\lambda/2$. A pressure range could be set for a certain length of fiber to allow for this condition. Different lengths of fibers could be used for different pressure ranges. The shorter the fiber, the smaller will be the $\Delta Z(t)$ change with higher detected pressure, and vice versa. Longer optical fibers mean greater pressure resolution. In order to allow for an increase and decrease in pressure and maintain an $\bar{E}_T$ swing in the first quadrant, $\bar{E}_T$ can be initially set at an angle of $\pi/4$ with respect to the x-axis by applying pressure to the $\bar{E}_1$ fiber thereby to cause an initial $\Delta Z(t)$ of $\lambda/4$. This then allows a $\pm \pi/4$ swing of $\bar{E}_T$ or a $\Delta Z(t)$ change in length of $\pm \lambda/4$.

In order to increase the dynamic range of this type of sensor, $\Delta Z(t)$ must be allowed to change by more than $\lambda/2$. This can be done by keeping track of the "handedness", i.e., the direction of rotation of the resultant $\bar{E}$-field, $\bar{E}_T$, on the face of the polarizer. To do this, the light wave is split into two beams and passed through two polarizers. The polarization axes between the polarizers are displaced by an angle less than 90°. When $\bar{E}_T$ rotates counterclockwise, the received power waveform from polarizer one will lead the received power waveform from polarizer two and vice versa. The frequency of the signal of interest causing $\Delta Z(t)$ is found by counting the time it takes for the first power waveform to go from a leading to a lagging position relative to the second power waveform. This time is then equal to one-half the period of the signal of interest. The magnitude of this signal is then related to the number of zeros or peaks on the power waveforms that take place up until the phase shift. The phase shift occurs when the input signal changes slope and, for a sinusoidal signal, this occurs at the input signals maximum amplitude.

The characteristics of the signal from the environment that causes the optic fiber to increase or decrease in length can be found from the power waveform as detected behind the polarizer. This power waveform may be designated $\bar{P}_{TP}$. To obtain an expression for this power waveform as a function of $\Delta Z(t)$, the pointing Poynting vector is used.

$$\bar{P}_{TP} = \tfrac{1}{2} Re\,(\bar{E}_{TP} \times \bar{H}_{TP}^*) \qquad (10)$$

where $\bar{H}_{TP}^*$ is the complex conjugate of the magnetic field associated with linearly polarized $\bar{E}_{TP}$. Since $\bar{E}_{TP}$ is linearly polarized, $\bar{H}_{TP}$ is given by $$\bar{H}_{TP} = \hat{a}_y \frac{\bar{E}_{TP}}{\eta} \qquad (11)$$

where $$\eta^2 = \frac{\mu}{\epsilon}, \text{ the permeability over the permitivity of the fiber cable.} \qquad (12)$$

such that in further consideration of equation 10, it follows that $$\bar{E}_{TP} = \hat{a}_x \{e^{j(\omega t - k_o \Delta Z(t))} + e^{j\omega t}\} \qquad (13)$$

and $$\bar{H}_{TP} = \hat{a}_y \frac{1}{\eta} \{e^{j(\omega t - k_o \Delta Z(t))} + e^{j\omega t}\} \qquad (14)$$

then, carrying out the Poynting vector equation 11, $$\bar{P}_{TP} = \hat{a}_z \frac{1}{\eta} \{1 + \cos(k_o \Delta Z(t))\} \frac{\text{watts}}{m^2} \qquad (15)$$

To get some idea for the sensitivity of this sensor, consider a fiber length change of $\lambda/2$ which would result in a $2.8 \times 10^{-7}$ meter length change for the one light wavelength presently used. This is a change in fiber length of about $1 \times 10^{-5}$ inch. The received power would change from zero to about five milliwatts, what amounts to a 100% modulation through such minute fiber length change. Since the power waveform can be measured and the expression (equation 15) that relates the change in length of the fiber to the power wave form is known, the time rate change in fiber length can be calculated, and this is related to the signal of interest exerted on the optical fiber.

To determine the maximum resolution of the sensor, the expression for the minimum detectable change in power from a given received power that the detector is capable of detecting must be known. The expression for this will include $\Delta Z(t)$, so the minimum change in length of the optic fiber cable can be determined and this will be the maximum resolution of the sensor. The expression for the minimum detectable change in received power from a given received power is given by:

$$\frac{\Delta P_{TP\,MIN}}{P_{TP}} = \left[ \frac{4 q B}{n S_D P_{TP}} \left(\frac{S}{N}\right)_{MIN} \left(1 + \frac{i_d}{S_D P_{TP}}\right) \right]^{\frac{1}{2}} \qquad (16)$$

where
$S_D$ is the detector sensitivity,
$i_d$ is the photodetector dark current,
$(S/N)_{MIN}$ is the minimum signal-to-noise ratio required (assumed to be 10),
n is the number of pulses averaged,
q is the electronic charge,
B is the electrical bandwidth of the detector system,
$P_{TP\,MIN}$ is the minimum detectable change of detected power at the detector, and
$P_{TP}$ is the received power at the detector.

Commercial detectors measure about 0.1 percent change in intensity. By setting equation (16) equal to 0.1 percent, and inserting equation (15) for $P_{TP}$, the minimum detectable change in fiber length $\Delta Z(t)$ can be found. This will be the maximum resolution of the system and will change for the various detectors that may be used.

Referring to FIG. 5, one form of sensor configuration 20 is shown. The sensor 20 is designed to restrict the amount of length change in the optical fiber to $\lambda/2$, as previously mentioned in relation to Equation (9). A light source 22 is a single-frequency, coherent light source, e.g., a commercially available form of semiconductor laser. Light from light source 22 is selected to be a wavelength that matches the center wave length characteristic of HNCP sheet 24. The HNCP sheet 24 consists of a polarizer and a quarter-wave plate and it functions to change unpolarized light into elliptically or circularly polarized light. Suitable forms of HNCP sheet are commercially available from the Polaroid Corporation. Circularly polarized light is produced when the wavelength of incident light falls at the center wavelength of the HNCP sheet 24. This wavelength is typically about 560 nanometers but such sheeting is available for other center wavelengths. It should be understood too that any other wavelength, 20 nanometers beyond either side of 560 nanometers, will be elliptically polarized. Since the light from light source 22 is single frequency and coherent whose wavelength is selected to match the center wavelength of the HNCP sheet 24, the sheet 24 will only produce single frequency, coherent, circularly polarized light.

A pair of lenses 26 and 28 having equal optical characteristics serve to couple the light from HNCP sheet 24 into the respective single-mode, polarization-preserving optical fiber cables 30 and 32. The fiber 30 is spun into a compact but loosely wound fiber coil 34 for function as the reference coil, and fiber 32 is wound similarly into a coil 36 which functions as the active coil. The reference fiber coil 34 is placed within a pressurized housing 38 thereby to provide a calibration constant. The active coil 36 is immersed in a suitable liquid, e.g., glycerin or other pressure transferring liquid medium, as contained within a housing 42 having a flexible diaphragm 44 at its base.

The diaphragm 44 then functions as the detector for interface with the subject disturbance whereupon it will change the pressure in the housing 42 while similarly affecting the active coil 36. This disturbance effect changes the effective length (or index of refraction) of the fiber coil 36 thereby to cause a power change at the detector, as described relative to the previous calculations. The circular polarized light from both of the continuing or output optical fibers 30a and 32a is directed upon a beam splitter 46 for birefringent reflection in two different directions shown by arrows 48 and 50. Both of the beams experience a change in handedness upon reflection from the beam splitter 46. The beam 48 from the reference fiber 30a impinges upon mirror 52 whereupon it experiences yet another handedness change for reflection back in the direction 53 similar to beam 50 from the active optical fiber 32a.

Both of the beams as indicated at 50 and 53 are then incident on the face of a polarizer 54 for presentation to a detector 56. Since the light from the reference fiber coil 34 experienced one more reflection than did the light from the active optical fiber coil 36, the handedness of both beams will be different. Due to this difference, the associated $\bar{E}$-field vectors will rotate in different directions about the face of the polarizer 54. The projection of the resulting $\bar{E}$-field vector onto the polarization axis of the polarizer 54 passes through the polarizer 54 to detector 56 and an electrical signal proportional to the received power is produced for input to the processing circuitry 58. The processing circuitry 58, which may include a programmed digital computer and requisite storage and output recording units, processes the resulting $\bar{E}$-field vector data signal, i.e., the power waveform of Equation (10), to derive the optical fiber change of length indication.

Referring to FIG. 6, alteration of the FIG. 5 circuitry is made by adding a dual detector configuration for the single beam detection of FIG. 5. This will allow not only $\lambda/2$ but any change in the optical fiber length to be determined. Thus, the only difference between the configurations in FIGS. 5 and 6 is the addition of another polarizer and detector. The extra optical components are needed to determine the handedness of the resulting $\bar{E}$-field, as previously mentioned.

The light waves of beam 50/53 shown separated for clarity, are made up of two circularly polarized waves of different handedness. The beam 50/53 is directed onto two polarizers 60 and 62 whose polarization axes are rotated from one another by an angle less than 90°. The light passed by polarizers 60 and 62 is then converted by respective detectors 64 and 66 and the electrical outputs on lead 68 and 70 are applied to processing circuitry 72. Thus, processing circuitry 72 functions to examine the power waveforms from each of detector 64 and 66 to then determine the frequency and amplitude of the signal of interest which is proportional to the change in length experienced by the test fiber in response to the environmental effector. The processing circuitry 72 functions to examine the power waveforms to process the frequency and amplitude data in accordance with the Equations (10) through (15).

Figure 7:
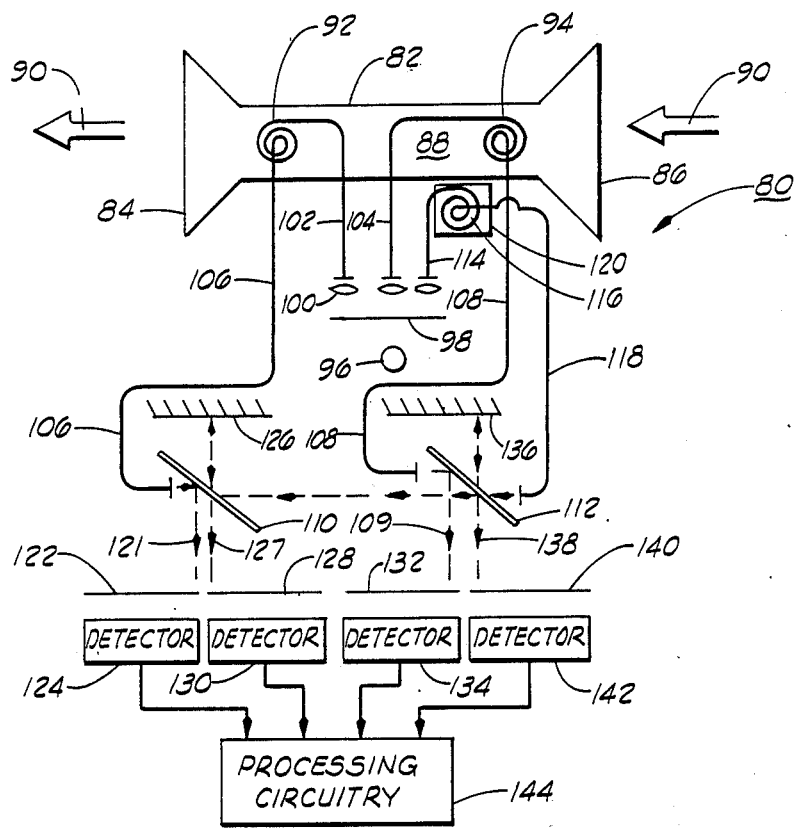
FIG. 7 is a schematic drawing of one form of pressure-sensitive device that may be utilized to measure shear waves in a borehole.

FIG. 7 illustrates the invention in a selected utilitarian form as it functions as a shear wave detector 80. Due to the nature of the components, the shear wave detector 80 can be greatly miniaturized so that it is suitable for shear wave detection down within a borehole. Detector 80 utilizes a double-ended, horn-type receiver 82 which is actually a reservoir having opposite end diaphragms 84 and 86 containing a suitable acoustic energy coupling fluid 88. The shear wave movement is indicated by arrows 90, and shear wave signal from a formation causes the residual borehole mud to move in accordance with the shear waves. The diaphragms 84 and 86 also move with the arrows 90 and cause a pressure drop and rise, respectively, in the receiver 82, as shown.

The actual detection response is sensed by the fiber optic active coils 92 and 94 as supported in opposite ends of receiver 82. A suitable light source 96, e.g., a single-frequency, coherent light source, directs light through the HNCP sheet 98 through a parallel lens assembly 100 into each of fiber optic cables 102, 104 for connection with the fiber coils 92 and 94. Light output from fiber coils 92 and 94 is then delivered by fiber optics cables 106 and 108 for presentation to respective beam splitters 110 and 112. A third fiber optic cable 114 receives light from lens assembly 100 for input to a reference fiber optic coil 116 and subsequent delivery by fiber optic cable 118 also for presentation on both of beam splitters 112 and 110. The reference fiber optic coil 116 is positioned in a suitable container 120 providing a constant environmental effect on coil 116.

Sensor light from fiber coil 92 is directed from fiber optic cable 106 off of beam splitter 110 and through polarizer 122 to detector 124. Reference light from fiber coil 116 on cable 118 is then directed onto beam splitter 110 for reflection onto mirror 126 and return through beam splitter 110 as beam 127 onto polarizer 128 and detector 130. The fiber optic coil 94, opposed to coil 92, delivers light energy by fiber optic cable 108 for reflection from beam splitter 112 as light beam 109 through polarizer 132 to detector 134. Once again, the reference light from coil 120 delivered by cable 118 is reflected onto a mirror 136 for reflection as beam 138 onto polarizer 140 and a detector 142. All outputs from the four detectors 124, 130, 134 and 142 are applied to the processing circuitry 144 which carries out the various processing and calculating steps necessary for output of the wave signal indication.

The shear wave signal from the associated formation will cause the mud to move to the left as shown by arrows 90. The diaphragms 84 and 86 will move accordingly to indicate a pressure drop in coil 92 and a pressure rise in coil 94 and, in this case, the coil 94 will lengthen in response to pressure drop while the coil 92 must shorten. These coil effects are detected by the handedness detectors consisting of detector pairs 124, 130 and 134, 142, and the detected output signals are passed to processing circuitry 144 for final determination of pressure indication. The shear wave detector 80 utilizes common mode rejection since all wave signals within the borehole will be in-phase except the shear waves which will be 180° out of phase. Thus, by processing outputs from each handedness detector, i.e., pairs of associated detectors, into a difference amplifier all signals will be removed except the shear wave signals. Processing circuitry 144 can then function to determine the shear wave amplitude and frequency and other relevant data.

Figure 8:
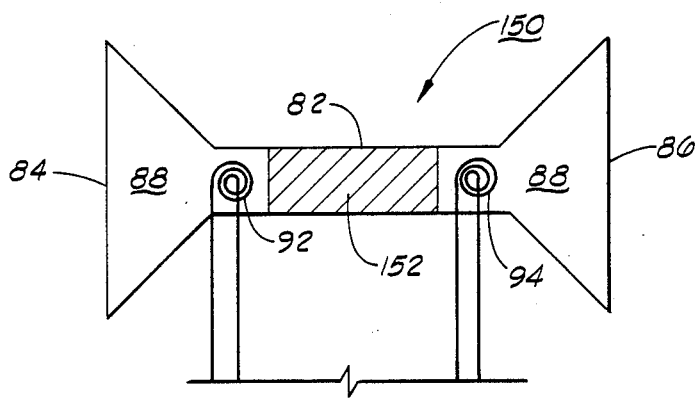
FIG. 8 is an alternative form of device for measuring shear waves in a borehole.

FIG. 8 illustrates an alternative form of shear wave sensor 150 which includes the similar type of reservoir or envelope 82 as shown in FIG. 7. Also, each end contains respective diaphragms 84 and 86 and each is filled with fluid 88; however, the center portion of sensor 150, between the active coils 92 and 94, contains a solid slug 152 which functions to permit a greater relative rise and drop of pressure at the opposite ends of the device. Thus, light response due to the external effector will produce significantly greater indications of frequency and amplitude for subsequent vector determinations.

FIGS. 9A and 9B illustrate in idealized representation some methods for combining the light energy from the ends of the fiber cables that may function to better advantage. In FIG. 9A, sensor light from the ends of fiber cables 154 and 156 are directed through an aperture 158 before impinging on the surface of a polarizer 160. In this case, polarizer 160 is made up of two different HNCP sheets, one producing right-hand and the other producing left-hand circular waves, and the size and position of aperture 158 are such that it will pass only the superimposed light from the two fiber optic cables 154 and 156 onto the surface of the polarizer. The duly polarized light from polarizer 160 is then converted at detector 162, and electrical signals are applied into the processing circuitry 164 for data evaluation.

FIG. 9B illustrates an even simpler way of combining light waves from a pair of fiber optic cables 166 and 168 which will contain the opposite handedness light signals. The opposite handed light signals are applied to a beam splitter at a 45° angle but from opposite sides to effect combination of a light beam 170 that is then passed through a polarizer 172 to the detector 174. Converted electrical signal is then applied to the processing circuitry 176 to refine output data.

While various forms of fiber optic coil may be utilized, it is suggested that the coil device can be made more compact and more sensitive to environmental effectors when spun disc-like into a flat configuration. The coil can then be made extremely thin which will allow placement within the sensor devices in various attitudes, some of which may be more sensitive than others. FIG. 9C shows yet another type of fiber optic coil 177 that may be used. Coil 177 is a type that includes an inner coated end 179 having a polarization-maintaining, reflective coating. This would allow but a single fiber optic lead 181 to be used to channel light both to and from the sensing coil 177 so that reflected light can be separated from ingoing light at the cable input/output 183 end for further optical combination and/or processing.

FIG. 10 illustrates an alternative form of the invention that utilizes circularly polarized light in the manner as aforedescribed with the exception that a second light source supplies the reference light beam. The circularly polarized light is propagated through a fiber cable which includes a sensing coil to detect changes in pressure, acoustic signals, or any other type of external effector that may cause a pressure change. Thus, the sensor device 180 utilizes fiber optic sensing but it requires no additional fiber optic network for purposes of comparison to determine the characteristics of the effector of interest.

A theoretical digression begins with the expression for a right hand circularly polarized wave emerging from a polarization preserving, single-mode, fiber cable at $Z=0$, with an intensity of 1, and with a change in fiber length of $\Delta Z(t)$, and these parameters are given by the previous Equation (4). When linearly polarized, coherent light of the same angular frequency as $\overline{E}_1$ of intensity 1, is added to $\overline{E}_1$ at the face of an $\hat{a}_x$-aligned polarizer, the expression for the total $\overline{E}$-field that passes through the polarizer may be established as Equation (6). If one then establishes the H-field associated with $\overline{E}_{TP}$, where $\eta^2 = \mu/\epsilon$, the time-averaged power at a detector behind the polarizer will be given by the Poynting vector, Equation (10). Using the $\overline{E}_{TP}$ and $\overline{H}_{TP}$ values as represented in Equations (13) and (14), the Pointing vector will be given by Equation (15).

The Equation (15) expression gives the time-average power at the detector as a function of the change in length of the fiber cable, $\Delta Z(t)$. It is then a simple matter to determine $\Delta Z(t)$ once having measured $\overline{P}_{TP}$ at the detector, and this expression gives a direct relationship to the change in fiber length, which is directly related to the effector disturbance, e.g., shear waves, $\overline{P}$-waves, pressure change or the like. The maximum resolution of the sensor is determined by the expression for the minimum detectable change in received power at the detector, and this expression is given by Equation (16).

Referring again to FIG. 10, the sensor device 180 utilizes a light source 182 directing a beam of light through a polarizer 184, e.g., a selected HNCP sheet. Light source 182 may be a single frequency, coherent light source such as a semi-conductor laser and the wavelength of the emanating light should match the center wavelength characteristics of the HNCP sheet so that the sheet or polarizer 184 produces coherent, single-frequency, circularly polarized light. This light is then directed through a lens 186 into the end of a fiber optic cable 188.

The fiber optic cable 188 may be continually formed into a fiber optic coil 190 as disposed within a suitable housing 192. The housing 192 is filled with an acoustic energy transmitting fluid 194 as retained by a vibration responsive diaphragm 196. The fiber optic cable 188 is preferably a single-mode, polarization preserving fiber cable of wellknown type, and it may be formed continuously to form not only the fiber optic coil 190 but the output fiber optic cable 198.

Light output from fiber optic cable 198 is reflected from a beam splitter 200 as beam 202 directed onto a polarizer 204. Reference signal is developed by a light source 206, a single-frequency, coherent, linearly polarized (SFCLP) light source such as a semi-conductor laser, propagating light onto the beam splitter 200 and to the mirror 208 for reflection as beam 210 back through the beam splitter 200 onto the polarizer 204. The mirror 208 may also function for aligning the beams 202 and 210 on the face of polarizer 204. A detector 212 then picks up light passed by polarizer 204 and generates an electrical signal for conduction to the processing circuitry 214.

The input signal to circuitry 214 is directly related to the power waveform as the detected signal can be further processed to derive all requisite data. Such data will be indicative of an environmental effector disturbing diaphragm 196 and fluid 194 to cause compressional variation in fiber optic coil 190. Any changes in pressure experienced by coil 190 will be translated into a change in length of fiber optic coil 190. The housing 192 may be initially pressurized in order to allow for a decrease in pressure signal, i.e., detection of an oscillating response about a mid-point.

Figures 11, 12:
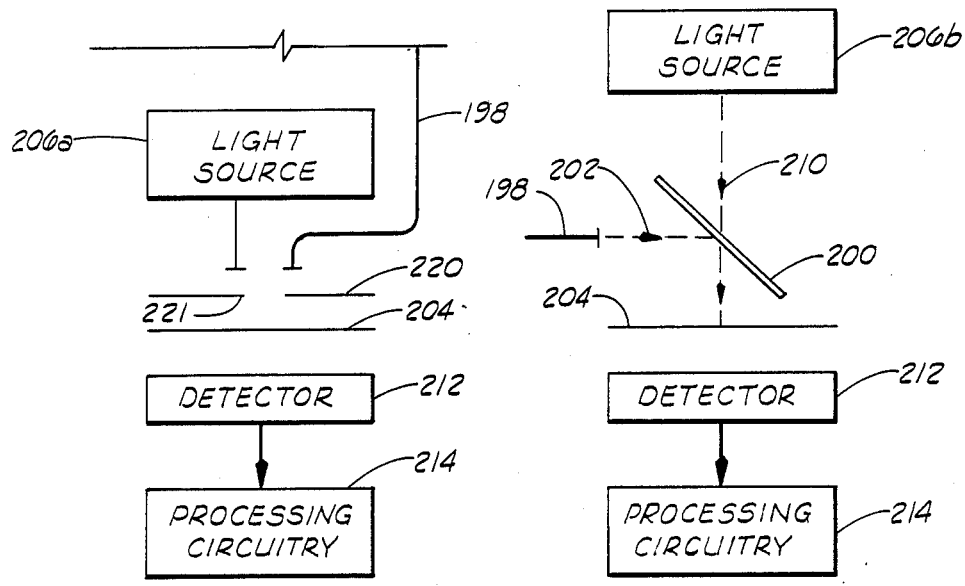
FIG. 11 is a schematic diagram of an alternative form of structure for combining two light waves.
FIG. 12 illustrates yet another alternative structure for combining two light waves.

FIG. 11 shows an alternative form of structure similar in operation to FIG. 10 but requiring less optics. Thus, light leaving the end of fiber cable 198 and light from the reference light source 206, the SFCLP light source, are superimposed on the face of the polarizer 204 after passing through an aperture plate 220. The position and size of the aperture 221 should be such that it passes only superimposed light to the polarizer 204. The rest of the device works the same way as that of FIG. 10 as detector 212 converts the received light to an electrical signal proportional to power waveform for input to processing circuitry 214.

FIG. 12 illustrates another scheme and what is probably the simplest way to combine two light waves as the sensor light output 198 is applied to beam splitter 200 in the same manner as in FIG. 10 and the reference light source 206b is aligned directly with the sensor beam 202 at the beam splitter 200.

Figure 13:
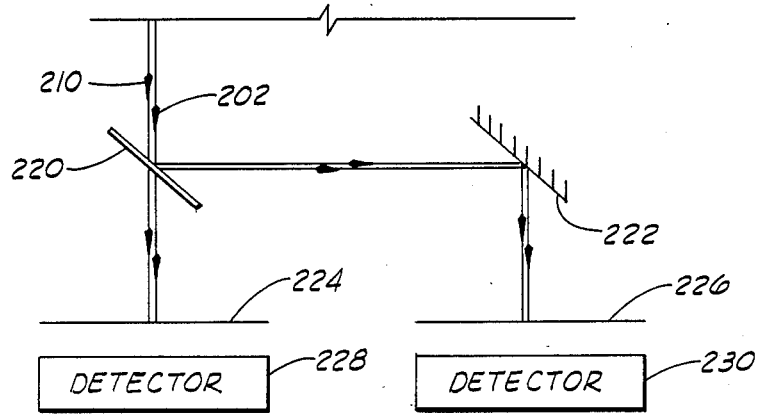
FIG. 13 is a schematic diagram of a handedness detector for polarization axis that are offset less than 90°.

Other configurations are possible for measuring shear waves and/or other wave disturbances in a borehole. These configurations would be the same as in FIGS. 7 and 8 except that the basic sensing element, and especially the reference element, is replaced by the structure of FIGS. 10-12. Also, the range of $\Delta Z(t)$ must be limited to $\lambda/2$; otherwise, a handedness detector must be used as shown in FIG. 13. In this case, the combined sensor light beam 202 from a sensing fiber coil and a reference beam 210 from a reference light source must be separately analyzed and distinguished. Thus, the light beams 202 and 210 are made up to two circularly polarized waves of different handedness, and they are dually reflected by a beam splitter 220 and mirror 222 onto respective oppositely polarized polarizer sheets 224 and 226. The light passed by polarizers 224 and 226 is then projected onto detectors 228 and 230 for conversion to electrical signals and input to subsequent electronic processing circuitry. It is important in this alignment that the polarization axes of polarizers 224 and 226 be offset by less than 90° in order to provide proper indication of handedness.

The foregoing discloses a novel disturbance sensor having very great sensitivity and such sensor devices are particularly adapted for use in various aspects of geophysical sensing such as detection of seismic waves as well as lesser side effect motions that may contribute to total isolation and evaluation of a seismic response. Actually, any type of environmental effector causing a pressure disturbance can be detected and evaluated using the pressure responsive enclosure and fiber optic coil. The sensitivity and clarity of sensor response is only limited by the practical considerations as to size of fiber optic coil. While the actual physical applications of such sensor device have not been greatly exploited heretofore, it is well contemplated that there are a great many sensing and surveillance applications that can use such high sensitivity sensor devices.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A method for sensing a physical disturbance, comprising:
    directing circularly polarized light through a coil of fiber optic cable confined in an environment sensitive to external pressure variations resulting from a disturbance;
    receiving said circularly polarized light on a polarizer having a predetermined axis of polarization; and
    determining the change in light passing through the polarizer which change is proportional to the change in length of said coil caused by said physical disturbance.

2. A method as set forth in claim 1 wherein:
    said change in light is a function of the angular position of the resultant electric field of the circularly polarized light relative to the axis of polarization.

3. A method as set forth in claim 2 which includes:
    detecting the power waveform of light passing through the polarizer and processing to derive a measure of the physical disturbance.

4. A method as set forth in claim 2 which includes:
    directing the circularly polarized light through a second coil of fiber optic cable confined in isolation from said external pressure variations to provide a reference source of polarized light.

5. A method as set forth in claim 4 which includes:
    detecting the power waveform of light passing through the polarizer from each of said coil and second coil of fiber optic cable to derive a finite measure of the disturbance amplitude and frequency.

6. Apparatus for sensing a physical disturbance comprising:
    a source of circularly polarized light;
    a first fiber optic coil having input and output ends and being responsive to length-changing disturbance, and receiving said circularly polarized light at the input end for projection at the output end;
    a reference light source projecting single frequency, coherent, second polarized light in beam alignment with said circularly polarized light;
    a polarizer receiving the aligned beam of circularly and second polarized light for transmission therethrough; and
    means for receiving light transmitted by said polarizer and determining the time-averaged power which is a function of fiber coil length change and proportional to the physical disturbance.

7. Apparatus as set forth in claim 6 which further includes:
    a beam splitter for receiving and beam aligning said circularly polarized light and said second polarized light for projection onto said polarizer.

8. Apparatus as set forth in claim 6 which is further characterized to include:
    a fluid-filled container housing said first fiber optic coil and having at least one flexible container wall for interface with the physical disturbance.

9. Apparatus as set forth in claim 6 wherein:
    said light from the reference light source is linearly polarized light.

10. Apparatus as set forth in claim 6 wherein:
    said light from the reference light source is circularly polarized light.

11. Apparatus as set forth in claim 6 wherein said source of circularly polarized light comprises:
    a source of single frequency, coherent light; and
    an HNCP plate receiving the source light for transmission as circularly polarized light.

12. Apparatus as set forth in claim 6 wherein said means for receiving comprises:
    a detector responsive to the light transmitted through the polarizer to generate a representative electrical signal; and
    processing circuitry receiving said electrical signal and determining the time-average power indication.

13. Apparatus as set forth in claim 6 wherein said reference light source comprises:
    a second fiber coil having input and output ends and receiving said circularly polarized light at the input end for projection at the output end of second polarized light in beam alignment with polarized light from the output end of said first fiber optic coil; and
    container means maintaining said second fiber coil free from external disturbance.

14. Apparatus as set forth in claim 12 wherein:
    said light from the reference light source is linearly polarized light.

15. Apparatus as set forth in claim 13 which further includes:
    a beam splitter for receiving and beam aligning said circularly polarized light and said second polarized light for projection onto said polarizer.

16. Apparatus as set forth in claim 13 wherein said means for receiving comprises:

a detector responsive to the light transmitted through the polarizer to generate a representative electrical signal; and processing circuitry receiving said electrical signal and determining the time-averaged power indication.

17. Apparatus as set forth in claim 13 which further includes:

a beam splitter for receiving said first and reference circularly polarized light beams and oppositely reflecting the beams; and a mirror reflecting said reference circularly polarized light back through said beam splitter in alignment with the reflected first circularly polarized light beam but of opposite circular handedness.

18. Apparatus as set forth in claim 17 wherein said polarizer comprises:

first and second polarizer plates each receiving the aligned beam, said plates having respective axes of polarization rotated by an angle less than ninety degrees.

19. Apparatus as set forth in claim 18 wherein said means for receiving comprises:

first and second detectors receiving light from said first and second polarizer plates and generating characteristic first and second electrical signals; and processing circuitry receiving said first and second electrical signals and determining the frequency and amplitude of the physical disturbance.

20. A signal detector device for use in seismic disturbance measurement, comprising:

a fluid-filled rigid container having at least one flexible wall portion oriented to receive a seismic disturbance;

fiber optic coil means having input and output ends with the coil means being supported within said fluid-filled container;

a light source providing circularly polarized light to the fiber optic coil means input end;

a polarizer receiving and transmitting first light from the fiber optic coil means output end;

a reference source of polarized light projecting a reference light for transmission through said polarizer; and detector means receiving the first and reference light transmitted through said polarizer for generating an electrical signal indicative of the frequency and amplitude of any seismic disturbance.

21. A device as set forth in claim 20 wherein said rigid container is further characterized to include:

at least two walls formed of flexible material and disposed in parallel relationship.

22. A device as set forth in claim 20 wherein said reference polarized light source comprises:

a source fiber optic coil having input and output ends and receiving said circularly polarized light at the input end and projecting said reference light from the output end; and means for maintaining said source fiber optic coil free from any seismic disturbance.

23. A device as set forth in claim 21 wherein said fiber optic coil means comprises:

first and second fiber optic coils which are of equal size and positioned in similar relationship to respective ones of said at least two walls.

24. A device as set forth in claim 22 wherein said rigid container is further characterized to include:

at least two walls formed of flexible material and disposed in parallel relationship.

25. A device as set forth in claim 24 wherein said fiber optic coil means comprises:

first and second fiber optic coils which are of equal size and positioned in similar relationship to respective ones of said at least two walls.

* * * * *